United States Patent [19]

Taylor et al.

[11] Patent Number: 5,226,133
[45] Date of Patent: Jul. 6, 1993

[54] TWO-LEVEL TRANSLATION LOOK-ASIDE BUFFER USING PARTIAL ADDRESSES FOR ENHANCED SPEED

[75] Inventors: George S. Taylor, Menlo Park; Michael P. Farmwald, Berkeley, both of Calif.

[73] Assignee: Silicon Graphics, Inc., Mountin View, Calif.

[21] Appl. No.: 444,594

[22] Filed: Dec. 1, 1989

[51] Int. Cl.[5] .................... G06F 12/00; G06F 12/03; G06F 12/10
[52] U.S. Cl. .................... 395/400; 395/425; 364/DIG. 1; 364/DIG. 2
[58] Field of Search ... 364/200 MS File, 900 MS File; 395/400, 425

[56] References Cited

U.S. PATENT DOCUMENTS

| | | | |
|---|---|---|---|
| 4,170,039 | 10/1979 | Beacon et al. | 364/200 |
| 4,218,743 | 8/1980 | Hoffman et al. | 364/200 |
| 4,400,774 | 8/1983 | Toy | 395/400 |
| 4,493,026 | 1/1985 | Olnowich | 364/200 |
| 4,602,368 | 6/1986 | Circello et al. | 364/200 |
| 4,682,281 | 7/1987 | Woffinden et al. | 395/400 |
| 4,737,909 | 4/1988 | Harada | 364/200 |
| 4,833,599 | 5/1969 | Colwell et al. | 395/650 |
| 4,914,582 | 4/1990 | Bryg et al. | 364/200 |
| 4,969,122 | 11/1990 | Jensen | 365/49 |
| 4,991,081 | 2/1991 | Bosshart | 364/200 |

FOREIGN PATENT DOCUMENTS

0019358  11/1980  European Pat. Off. .
WO87/04544  11/1986  PCT Int'l Appl. .

OTHER PUBLICATIONS

"Fast Cache Access Based On Most Recently Used Hits", IBM Technical Disclosure Bulletin, Mar. 30 (1988), No. 10, Armonk, N.Y.

"The TLB Slice—A Low-Cost High-Speed Address Translation Mechanism", Taylor et al., 8345 Computer Architecture News, Jun. 18 (1990), No. 2, N.Y., IEEE (1990), pp. 355-363.

Primary Examiner—Joseph L. Dixon
Assistant Examiner—Michael A. Whitfield
Attorney, Agent, or Firm—Townsend and Townsend Khourie and Crew

[57] ABSTRACT

A translation of a portion of a virtual page number to a portion of a physical page number in a "TLB slice." The slice translation is used to index into a physical cache memory which has virtual tags in addition to physical tags and whose addresses are physical. By comparing the virtual tag to the input virtual address page number, it can be determined whether there was a hit or a miss in the combination of the TLB slice and the cache memory. By translating only a few bits of the virtual address to a few bits of a physical address, the speed of the device is greatly enhanced. This increased speed is achieved by making the TLB slice direct-mapped and by taking advantage of its small size to build it with special hardware (either high-speed RAM (random access memory) or with latches and multiplexers). There is no separate comparison at the TLB slice output for determining a TLB slice hit. The subsequent cache tag comparison is used to indicate both whether the translation was correct and whether there was a cache hit. To achieve this dual purpose comparison, however, a virtual tag must be combined with a physical cache to determine whether there is a hit, since the entire virtual address has not been translated and therefore there is no translated physical address to compare with a physical tag.

10 Claims, 8 Drawing Sheets

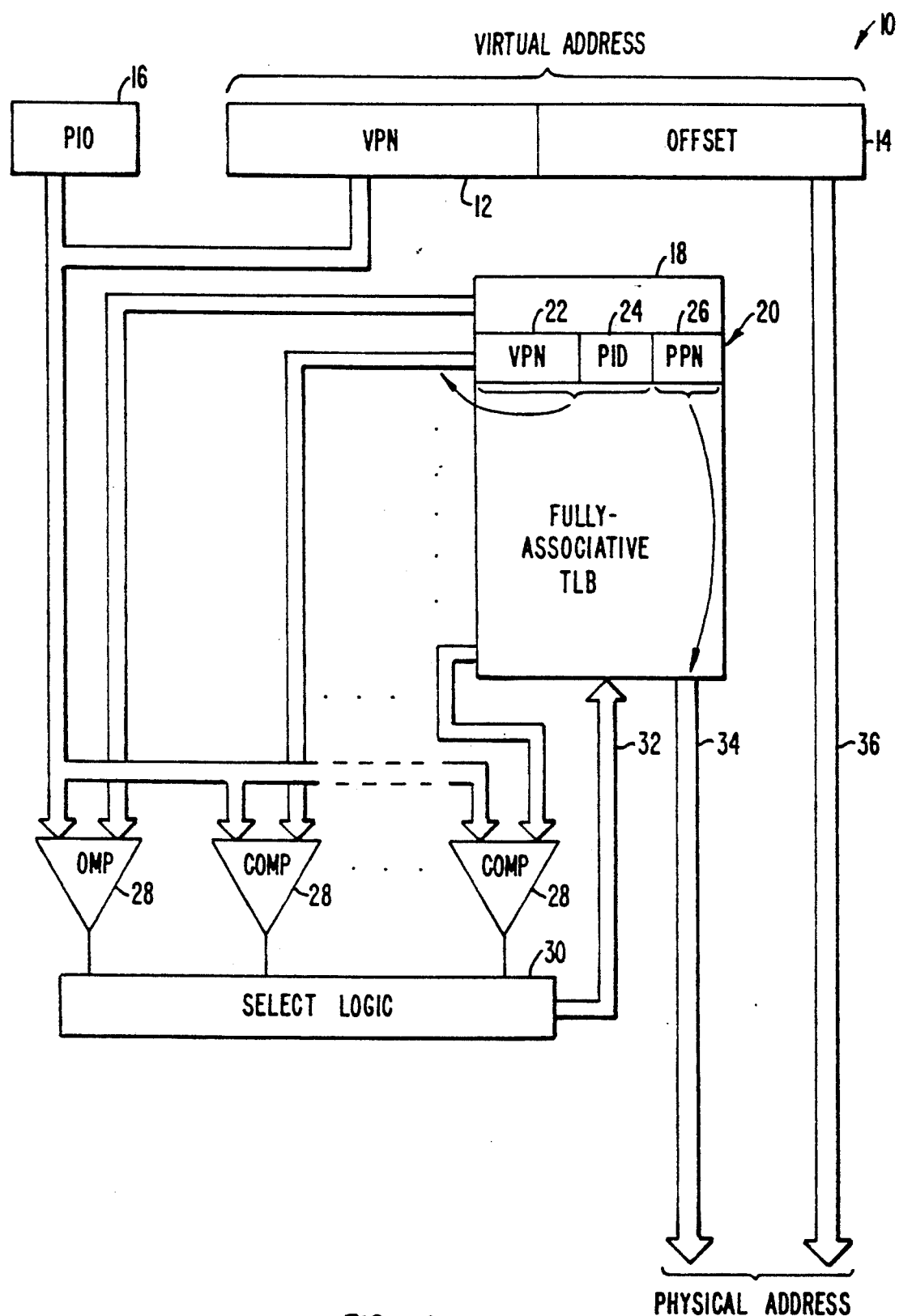
FIG.\_1.
PRIOR ART

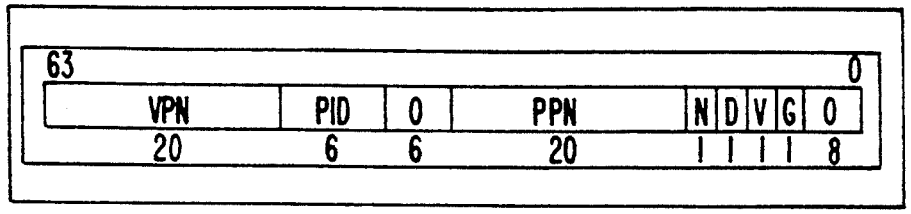
FIG._2.
PRIOR ART
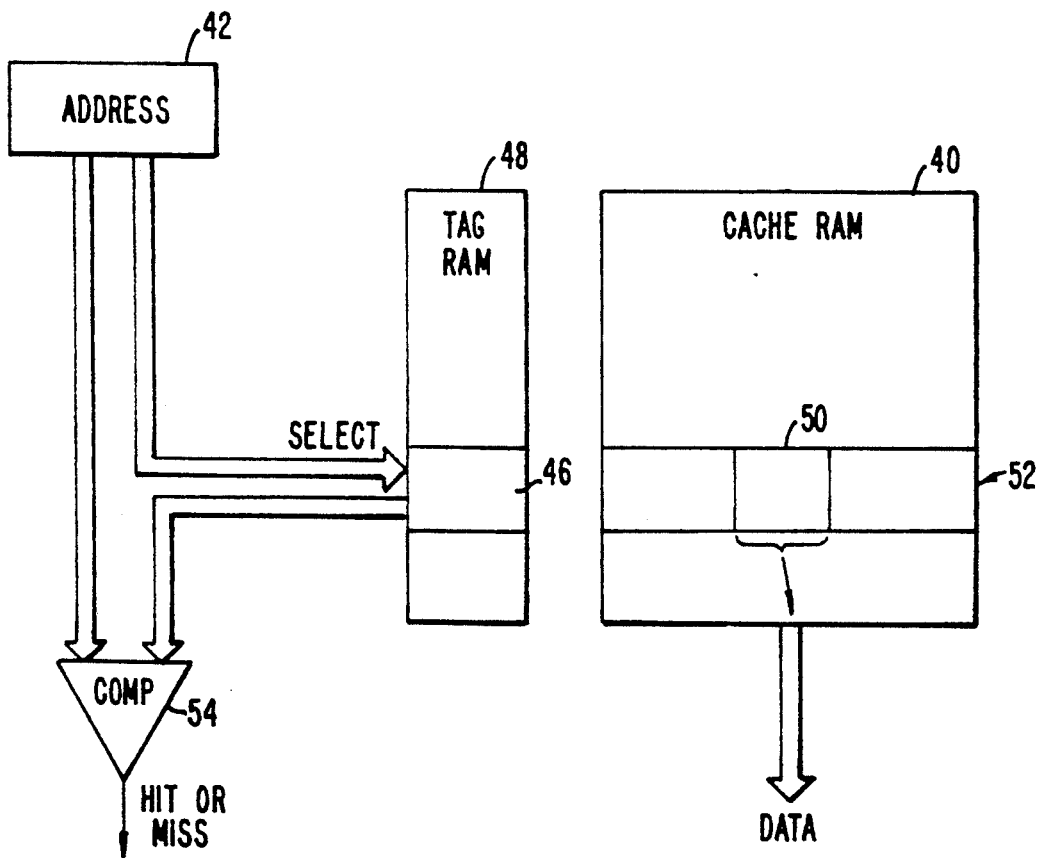
FIG._3.
PRIOR ART

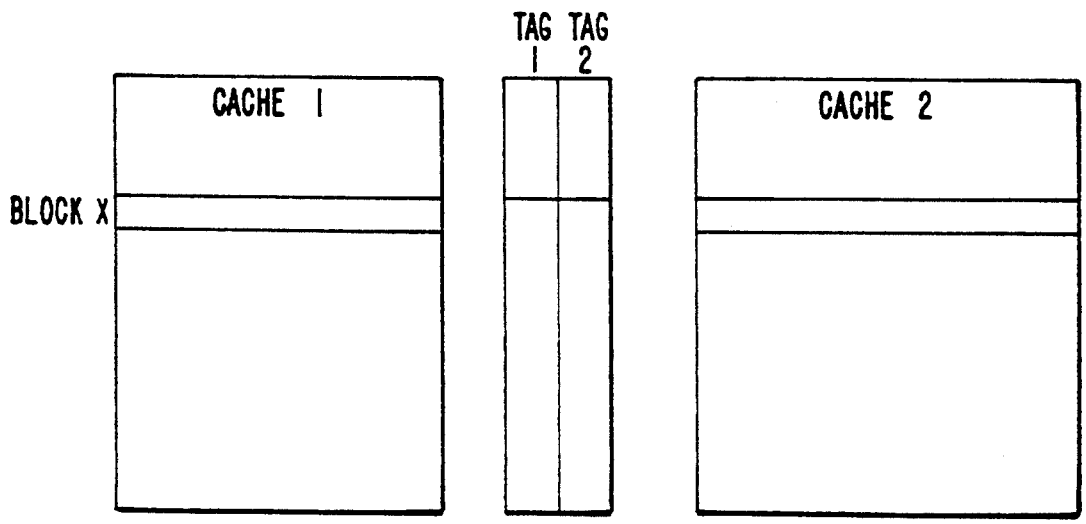
FIG._4.
PRIOR ART
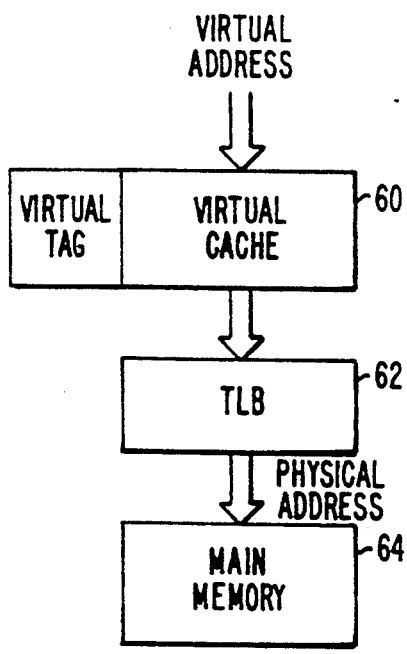
FIG._6.
PRIOR ART
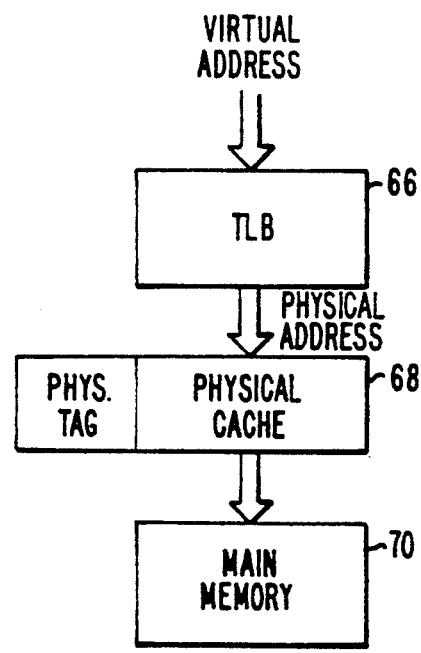
FIG._5.
PRIOR ART

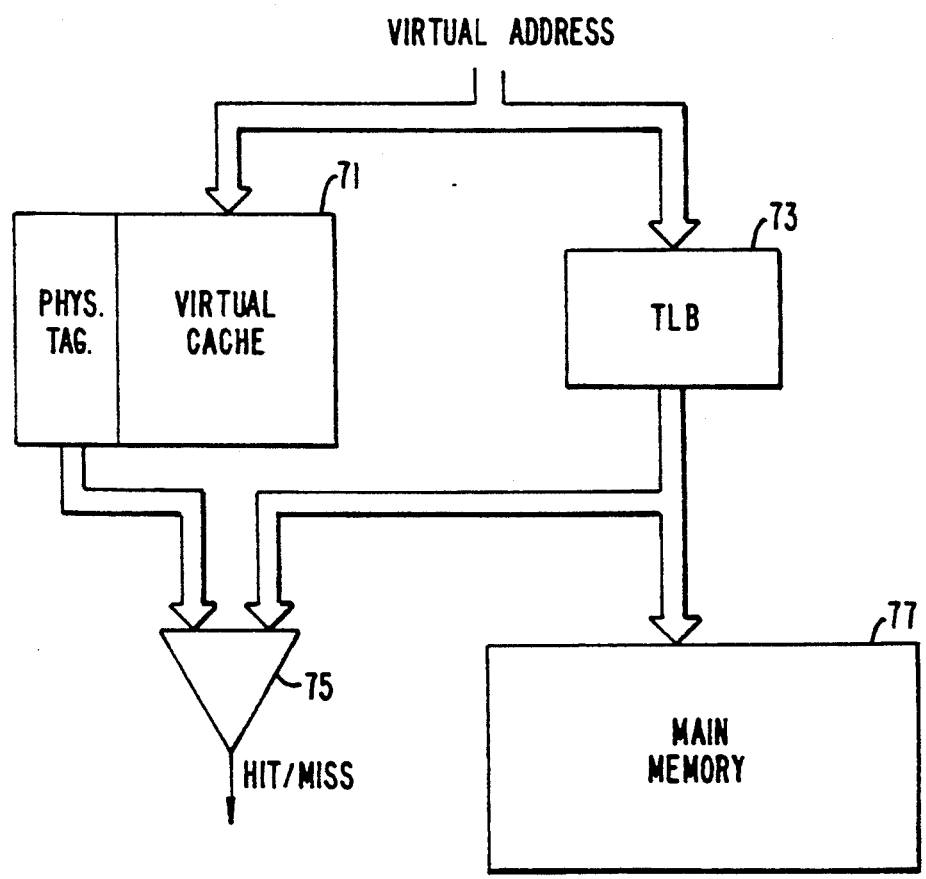
FIG._7.

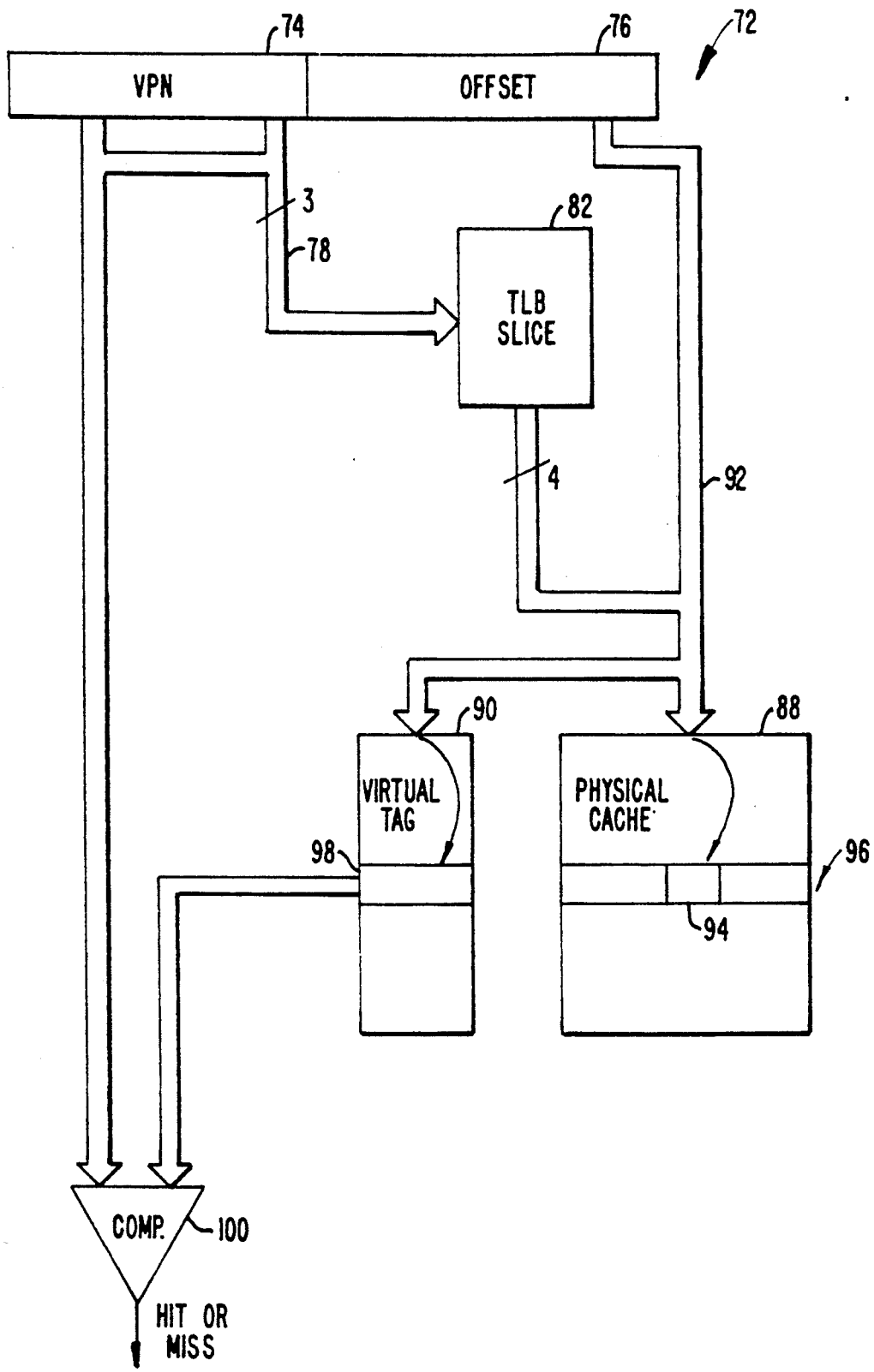
FIG._8.

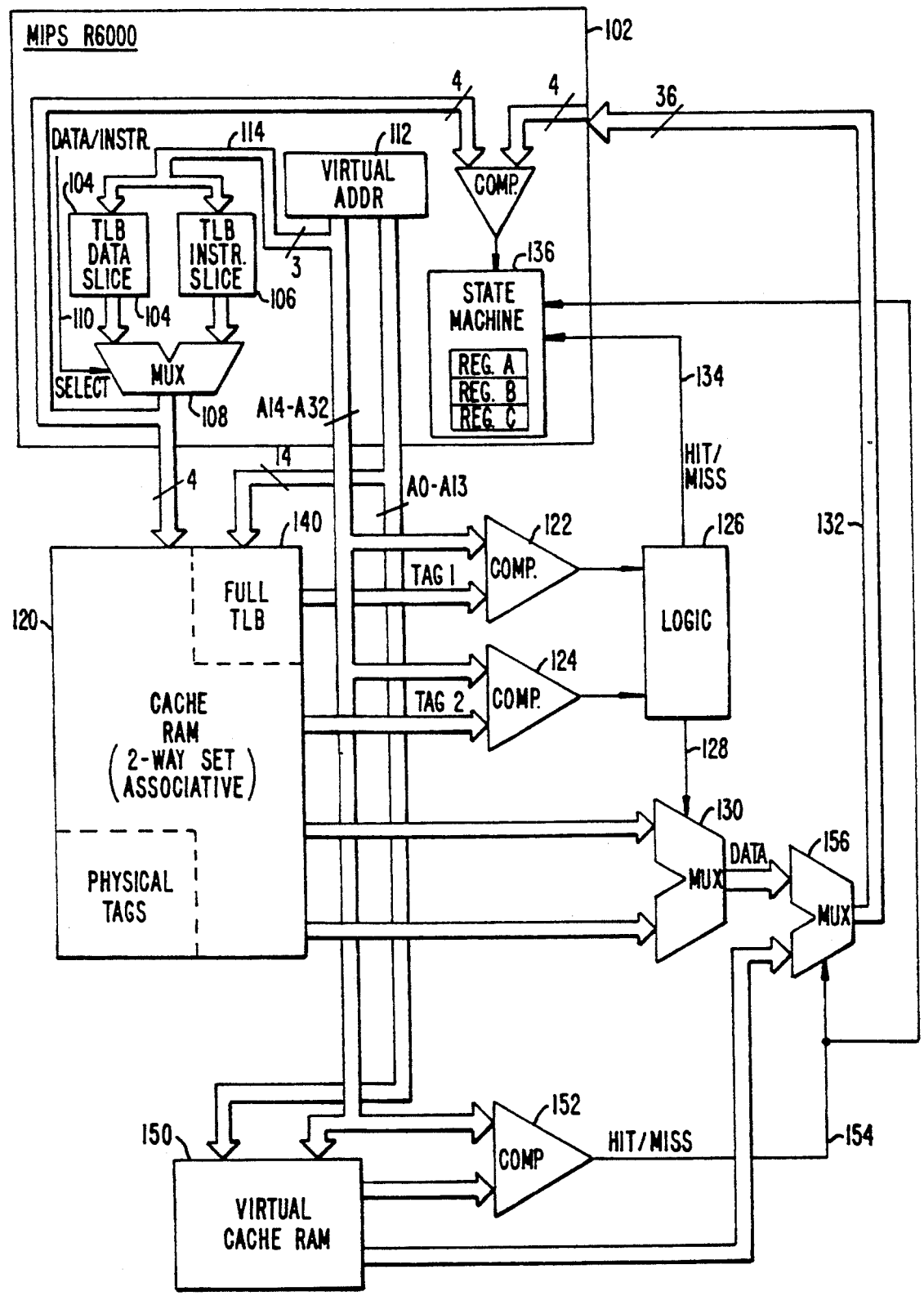
FIG._9.

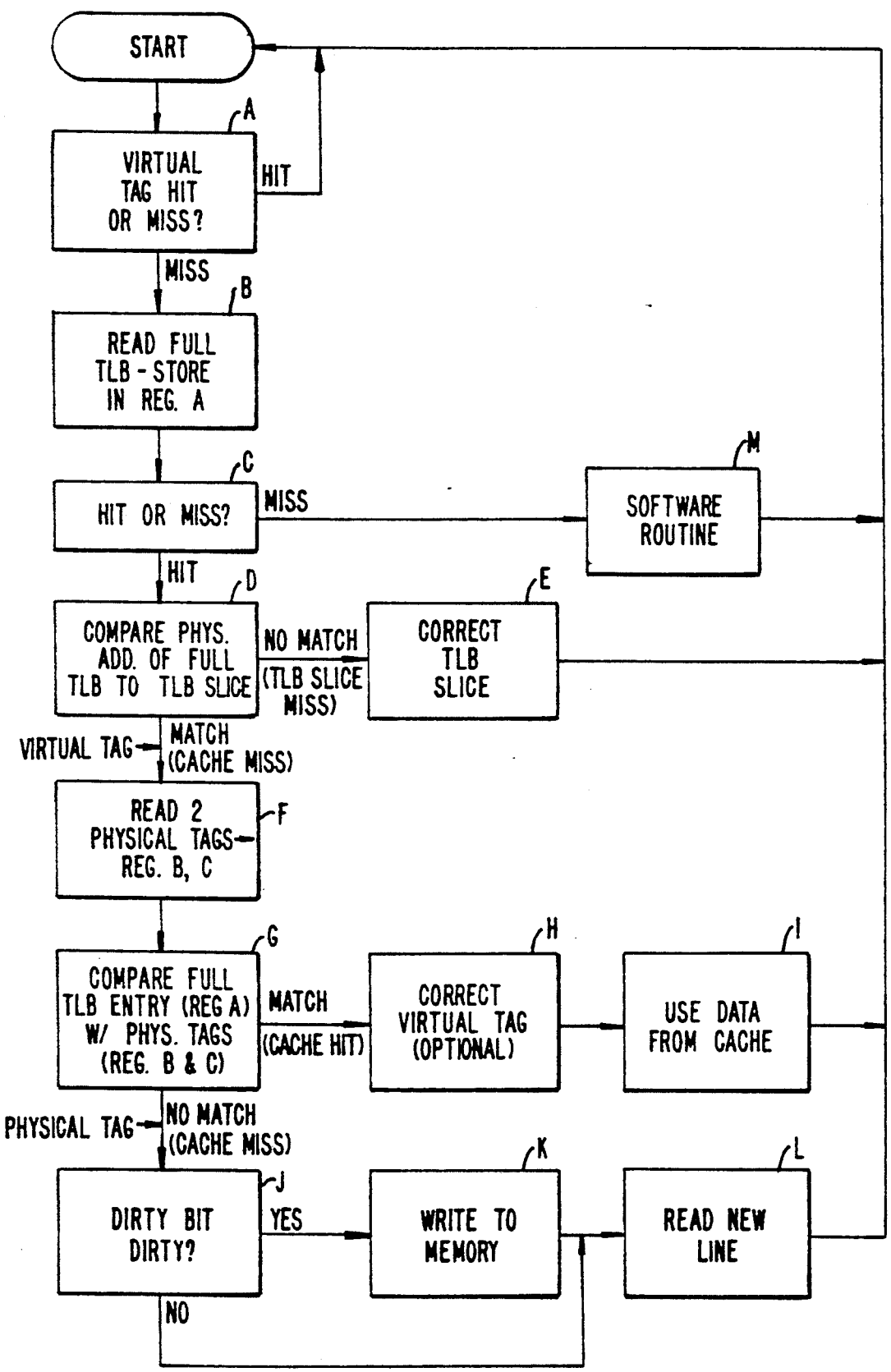
FIG._10.
STATE MACHINE

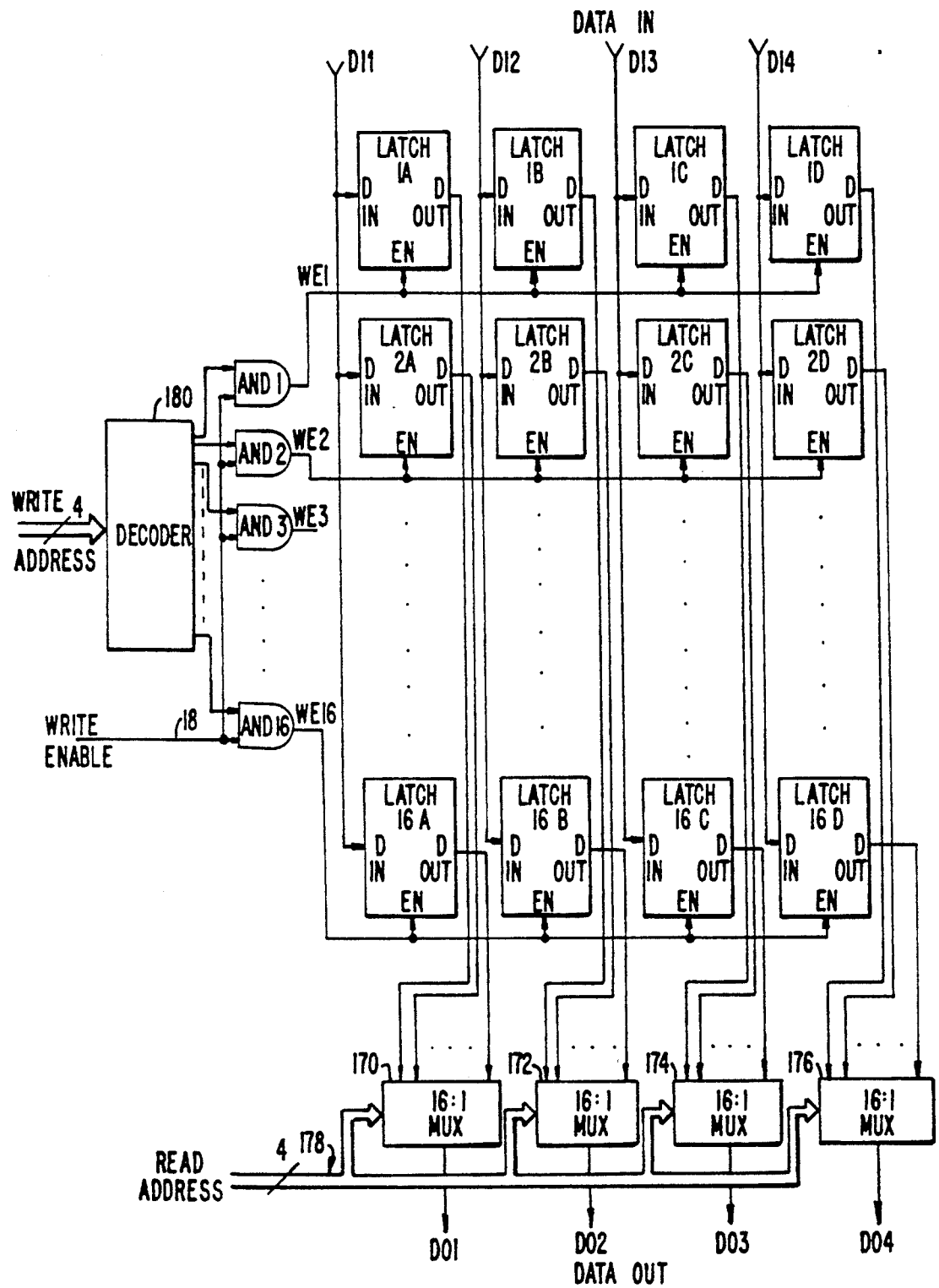
FIG._11.

TWO-LEVEL TRANSLATION LOOK-ASIDE BUFFER USING PARTIAL ADDRESSES FOR ENHANCED SPEED

BACKGROUND

The present invention relates to translation look-aside buffers (TLB) for converting virtual addresses into physical addresses.

In a multiple user computer system, several different programs may want to use the same virtual address. In order to accomplish this, a translation look-aside buffer (TLB) contains a table which redirects the "virtual" address, which may be used by several programs, to a separate "physical" address for each program. This often occurs since each program prefers to start at address 0. A TLB can also be used when two different virtual addresses share the same physical address, and the system has to keep track of who wrote to that physical address last. A TLB can thus give the capability to control and track memory accesses. Some parts of memory can be designated as not writable or not readable by certain programs, for instance. In one version, the TLB distinguishes between the same virtual address for different programs using a process identification code (PID) associated with each program.

The TLB can be fully associative, direct-mapped or anywhere in-between. In a fully associative TLB, a particular translation can be anywhere in the TLB. Upon each memory access, the virtual address must be compared to all of the contents of the TLB. This would be very time consuming if done sequentially, and is thus done simultaneously through the use of a large amount of hardware and comparators. For a direct-mapped TLB, there is a single location in the TLB for the translation of each virtual page address. The virtual page address is thus used as an index to the proper location in the TLB for the translation. If the entry is not in the TLB, a trap to software is done. The software contains a full listing for all translations.

Although a processor may contain only a TLB and a main memory, a "cache" memory is often used in conjunction with a TLB. The cache memory is a small, quickly accessed memory which stores the most recently accessed data (or instructions) in anticipation of being used again and thus enabling the elimination of the longer access time to main memory. A cache memory will have a data portion and a tag portion. The tag portion contains the addresses of the data which are stored in the data portion. Each address requested by a program is compared with the tag addresses to see if the data is present. If it is present, the data is accessed from the data cache. Otherwise, the system has to go to main memory for the data. In that case, the data is used and is also stored in the cache so that it will be available for the next access. Typically, the data will be transferred from main memory to the cache, and then accessed from the cache. This way, only a single access path is required, since there is no need for a separate access directly to main memory bypassing the cache.

Data is typically written into a cache in a block, which includes the desired data and other bytes of data in the same area of memory. This is done because it is likely that a subsequent memory access will be to the same block.

A "fully associative" cache can hold as many blocks as will fit into the cache, independent of where the blocks were located in the main memory. However, on each memory access, all of the tags must be compared to the address, thus significantly slowing the memory access process or requiring more hardware. A less costly and faster cache system is a "direct-mapped" cache where each block has a designated in the cache. That location is used by a number of blocks. On a memory access, only that location needs to be accessed to determine if the tag for the desired block is present. This has the advantage of lower cost and greater speed, but the disadvantage that only one block from the group assigned to a single cache location can be present in the cache at any one time. The principal speed advantage of the direct-mapped structure is that the processor can start to use the data in parallel with a determination that it is the correct data (cache hit). If there is a cache miss, the use of the data is aborted.

The standard cache memory is a physical cache which takes a physical index and has physical tags (IBM 3090, DEC VAX 11/780, MIPS RC3260). A physical cache is located after the TLB has translated a virtual address into a physical address (see FIG. 5). This type of cache uses the address after it has been translated into a physical address by the TLB, and thus has a physical address for comparison to a physical cache tag. Another type of cache is a virtual cache which is indexed with a virtual address. A virtual cache eliminates the need for a TLB in the case of a cache hit, thus speeding up the memory access operation since the TLB translation does not need to be done before going to the cache. One type (Sun 3/200) stores a virtual address tag at a virtual address index (see FIG. 6). This type of virtual cache system requires system management to insure that virtual addresses which map to a single physical address are handled properly. Another type of virtual cache uses virtual indexes, but physical tags (ELXSI 6400). In this type, a TLB operates in parallel to generate the physical address for comparison to the cache tag to determine if there is a hit (see FIG. 7).

SUMMARY OF THE INVENTION

The present invention provides a translation of a portion of a virtual page number to a portion of a physical page number in a "TLB slice." The slice translation is used to index into a physical cache memory which has virtual tags in addition to physical tags and whose addresses are physical. By comparing the virtual tag to the input virtual address page number, it can be determined whether there was a hit or a miss in the combination of the TLB slice and the cache memory.

By translating only a few bits of the virtual address to a few bits of a physical address, the speed of the device is greatly enhanced. This increased speed is achieved by making the TLB slice direct-mapped and by taking advantage of its small size to build it with special hardware (either high-speed RAM (random access memory) or with latches and multiplexers).

There is no separate comparison at the TLB slice output for determining a TLB slice hit. The subsequent cache tag comparison is used to indicate both whether the translation was correct and whether there was a cache hit. To achieve his dual purpose comparison, however, a virtual tag must be combined with a physical cache to determine whether there is a hit, since the entire virtual address has not been translated and therefore there is no translated physical address to compare with a physical tag.

A full TLB must still be used in the event of a miss, but the full TLB does not need to be as fast and thus does not require a dedicated bank of RAM. The small hardware mechanism of the present invention makes it possible to put address translation on the same chip as the processor, even in a technology with limited density, significantly increasing the address access speed to a physical cache.

The TLB slice of the present invention is much smaller, and thus much faster, than a normal TLB. It is on the order of 100 times smaller. There are several factors which allow the TLB slice to be small. Since there is no comparison to determine a miss, there is no need to store the virtual page number. Also, only a few physical page number bits and a few entries are needed, due to the use of a large page size and a two-level cache.

Preferably, separate TLB slices are used for instructions and data. This makes each of the two TLB slices even smaller and faster. This gives advantages comparable to the advantages of a two-way set-associative memory, in which there are two possible places for translations in a particular block, thus increasing the chances of a hit. Since the TLB slice does no comparison, a two-way set-associative structure cannot be used directly.

For a fuller understanding of the nature and advantages of the invention, reference should be made to the ensuing detailed description taken in conjunction with accompanying drawings.

BRIEF DESCRIPTION OF THE DRAWINGS

FIG. 1 is a diagram of a prior art, fully-associative translation look-aside buffer (TLB);

FIG. 2 is a diagram of the format of a TLB entry of the prior art;

FIG. 3 is a diagram of a prior art direct-mapped cache system;

FIG. 4 is a diagram of a prior art two-way set associative cache system;

FIG. 5 is a diagram of a prior art physical cache system with physical tags;

FIG. 6 is a diagram of a prior art virtual cache system with virtual tags;

FIG. 7 is a diagram of a prior art virtual cache system with physical tags;

FIG. 8 is a high-level diagram of a TLB slice system according to the present invention;

FIG. 9 is a more detailed diagram of the system of FIG. 8;

FIG. 10 is a flowchart of the state machine of FIG. 9; and

FIG. 11 is a circuit diagram of the TLB slice.

DETAILED DESCRIPTION OF THE PREFERRED EMBODIMENTS

FIG. 1 shows a fully-associative translation look-aside buffer (TLB) according to the prior art. A virtual address is produced by a computer system (not shown) in a virtual address register 10. The high order bits of the address form a virtual page number (VPN) 12. The low order bits form an offset 14 giving the exact location of the desired byte in the page. A process ID (PID) 16 stored in the system identifies the particular process which is running. A TLB 18 is provided, typically in RAM. TLB 18 might have, for example, 64 entries like entry 20. Entry 20 includes the virtual page number (VPN) 22, process ID (PID) 24 and the corresponding physical page number (PPN) 26.

A number of comparators 28 are provided. If there are 64 entries in the TLB, there will be 64 comparators 28. Each comparator compares PID 16 and VPN 12 to each of the VPNs 22 and PIDs 24 in TLB 20. The one which matches is determined by select logic 30, which in turn provides an address input on lines 32 to the TLB to cause the proper PFN 26 to be output on lines 34 as the physical page number. The PFN is combined with the offset on lines 36 to provide the entire physical address. As can be seen, a large amount of hardware is required to do the simultaneous comparison of all the entries in TLB 20. Alternately, for a direct-mapped TLB, a single comparator could be used with each entry having a single, assigned location to which a part of the virtual address indexes. TLB entry 20 can be written into and modified to accommodate the particular programs which are using the system at any given time. As can be seen, several different programs can have the same VPN, but will have different PIDs, enabling the decoding to different physical addresses.

The TLB shown in FIG. 1 is fully-associative: any entry can be at any location. Alternately, the TLB could be direct-mapped: each TLB entry would have a single, assigned location and part of the virtual address would index to that location. Thus, instead of many comparators past the TLB, indexing logic in front of the TLB and a single comparator could be used.

FIG. 2 shows a typical prior art TLB entry, which will often have more bits than the VPN, PID and PFN shown in FIG. 1. In addition to these numbers, the TLB entry includes a bit (N) which indicates that the page is "non-cacheable". If this bit is set, the page is marked as non-cacheable and the system directly accesses main memory instead of first accessing cache. The bit "D" indicates that the page is "dirty". When this bit is set, the page is writable and the bit therefore serves as a "write-protect" bit that software can use to prevent alteration of data. The "V" bit is a valid bit which, if set, indicates that the TLB entry is valid. Otherwise, a miss occurs. The "G" bit is a global bit. If this bit is set, the PID match requirement is ignored for valid translation. The global bit allows multiple programs to share the same space (map the same virtual page numbers to the same physical page numbers). The bits marked "0" are reserved bits.

FIG. 3 is a block diagram of a typical prior art direct-mapped cache system. The cache system allows addresses which are frequently called to be stored in a cache RAM 40 which is quickly accessed. A portion of address 42 is provided as an index which selects a particular tag 46 from a tag RAM 48 and a particular byte of data 50 in a block 52 in cache RAM 40. Since sequential memory locations are often accessed, each byte of data pulled to cache is typically pulled with a block of surrounding bytes which is put into cache frame 52 of the cache RAM.

The system shown in FIG. 3 is a "direct-mapped" cache in which each address is assigned a particular cache frame 52 in which it must be stored. A group of different blocks of memory are assigned to the same cache frame. A portion of address 42 acts as an index to select the particular cache frame based on the address. To determine if the exact desired address is in the frame selected, the tag 46 is compared to the high order portion of address 42 by comparator 54. The limitation of a cache of this sort is that only a single block from each group can be stored at any one time.

Another type of cache is a fully associative cache in which each address can be stored anywhere in the cache RAM. However, this type of cache requires that all of the tags in tag RAM 48 be compared to the address. This requires a system with a lot of hardware, such as the multiple comparators of FIG. 1, or a system which is much slower due to the need for a large number of sequential comparisons to all the tags in RAM 48.

FIG. 4 shows a prior art system for improving the hit ratio for a "direct-mapped" cache. Two caches are provided in parallel, with two tag RAMS in parallel. Upon a block X being accessed, both tags are compared to the address. Thus, two different blocks from the same group can be simultaneously present. This type of system can be extended to multiple parallel caches, but two is a highly effective number.

A combination of a cache with a TLB can be done in two ways. The cache operates upon an address generated by the computer system, and, as in apparent from FIG. 1, two addresses are present, the virtual address and the physical address.

A physical cache system of the prior art with physical tags is shown in FIG. 5. A TLB 66 operates on the virtual address to produce a physical address. This physical address is than provided to a physical cache 68. If there is a miss, the address is subsequently provided to main memory 70.

FIG. 6 shows a system in which a virtual cache with virtual tags is used to operate on the virtual address before the TLB translation is done. A virtual cache 60 receives the virtual address and, if there is a miss, the address is provided to TLB 62. A physical address output from TLB 62 can then be provided to main memory 64.

FIG. 7 shows a virtual cache with physical tags. The virtual address is provided to a cache 71 and a TLB 73 in parallel. By indexing into the cache directly with the virtual address, the data (or instruction) can be retrieved without waiting for a translation. The translation in done in parallel, and compared in a comparator 75 to a physical tag. If there is a miss, the cache data is not used, and the TLB translation is used to fetch the correct data from main memory 77.

FIG. 8 is a high-level diagram of the TLB slice system according to the present invention. A virtual address 72 is provided having a virtual page number (VPN) 74 and an offset 76. The least significant three bits of VPN 74 are provided on lines 78 as an address to a memory (TLB slice) 82 which contains 8 entries of 4 bits (A number other than 4 could be used). The output of TLB slice 82 is used as a physical index, combined with offset 76, to address a physical cache 88 and a virtual tag memory 90. The offset 76 is provided on lines 92 to cache 88 to select a particular byte 94 in a block 96 indicated by some of the offset bits and the higher order bits from TLB slice 82. A virtual tag 98 associated with block 96 is provided to a comparator 100 for comparison with the full VPN 74. A favorable comparison will indicate a hit. It should be noted that any number of indexing schemes may be used, and that a block in cache 88 need not correspond to a page.

Each of the eight entries in TLB slice 82 stores the physical index to cache 88 for the last used virtual address whose least significant three page bits correspond to the entry's address in TLB slice 82. Thus, if a subsequent reference is to the same virtual address, there will be a cache hit. In the event of a TLB slice or cache miss, a full TLB translation must be done. Note that because there is no separate hit/miss determination for the TLB slice, a miss could be due to either the TLB slice or the cache. The full TLB translation allows a determination to be made of whether it was a TLB slice miss or a cache miss. For a cache miss, the correct data is fetched and stored in cache 88. For a TLB slice miss, TLB slice 82 is updated. Since addresses are often fetched in sequence, the use of a lower 3 bits of the VPN assures that a sequential series of 8 addresses can be stored in TLB slice 82. The TLB slice could be implemented with other than the 3 low order bits of the VPN.

FIG. 9 shows a preferred embodiment of the TLB slice according to the present invention in more detail. The TLB slice mechanism is contained in a processor chip 102. Two TLB slices are provided, a TLB data slice 104 and a TLB instruction slice 106 (104 and 106 are actually a single logic circuit, with a control signal selecting one portion or the other). The appropriate one to be used is determined by a multiplexer 108 under the control of a select line 110 which selects one or the other depending upon whether the operation is for data or for an instruction as determined by the decoding circuitry of the processor (not shown). Three bits of a virtual address 112 are provided on lines 114 to both TLB data slice 104 and TLB instruction slice 106.

The physical index from the appropriate slice is provided to a cache RAM 120. Cache RAM 120 contains both the tag and data for the selected block. In the preferred embodiment shown, two parallel caches are provided in the manner shown in FIG. 4 for a two-way set-associative cache. Here, however, the tags are virtual tags. Both tags are selected and are provided to comparators 122 and 124, respectively. These comparators compare the tags to the virtual page number to determine whether either one is a hit and which is the correct tag. A logic circuit 126 determines which is the correct tag and selects the corresponding data through a select input 128 to a multiplexer 130. The proper data is then provided on data line 132 back to processor 102. Logic circuitry 126 also provides a hit/miss indication on a line 134 to state machine logic 136 in processor 102. In the prior art, two hit/miss lines would be needed, one for the cache and one for the TLB.

The full TLB in one embodiment is stored in an area 140 of cache RAM 120.

The present invention is preferably implemented in a system which uses a virtual cache with virtual tags prior to accessing the TLB slice. Hits in this primary cache will eliminate references to the TLB slice and give a sufficient overall hit ratio to justify the mechanism. The TLB slice is accessed only after a miss in this primary virtual cache. In the embodiment of FIG. 9, the virtual cache is stored in RAM 150, and the comparison uses a comparator 152. The hit/miss signal is provided on line 154. State machine 136 includes logic for accessing TLB slices 104, 106 upon a cache miss. The TLB slice translation is actually done in parallel to give improved speed, but if there is a virtual cache hit, hit line 154 selects the data from cache 150 by providing a select signal to multiplexer 156.

A flowchart setting forth the operation of state machine 136 is shown in FIG. 10. Upon the determination that there has been a virtual tag cache miss (Step A) the full TLB 140 is read (Step B) and its contents are stored in a register A in the state machine. If the full TLB also misses (Step C), a flag is set and software takes over to do a full read from memory and store the appropriate results in the full TLB.

If there is a hit in the full TLB, the full TLB is compared to the TLB slice (Step D). If there is a match, this indicates a cache miss. If there is no match, this indicates a TLB slice miss. For a TLB slice miss, the correct physical index, as determined by the full TLB, is written into the appropriate TLB slice position (Step E).

If there was a cache miss, the two physical tags are read and stored in registers B and C in the state machine (Step F). (In one embodiment the physical tags are stored in a reserved portion of the cache, but there could be a separate RAM for the physical tags). The contents of register A (full TLB) and registers B and C (tags 1 and 2) are then compared (Step G). If there is a match on one of these comparisons, this indicates that there was actually a cache hit, but that two virtual addresses were mapped to the same single physical address. In order to cause a virtual tag hit on the next reference to this same cache line, the virtual tag is corrected by copying the correct PID into the cache tag (Step H) and the cache data is used (Step I).

If Step G indicates no match, there was a physical tag cache miss. The dirty bit is then checked (Step J). If the dirty bit is set, the cache has been written to for whatever address is there, and main memory has not been written to. Accordingly, the contents of the cache are written to main memory (Step K) and the new block is read from main memory and stored in the cache (Step L). At the same time, the virtual tag and the physical tag for the cache block are written to, and the dirty bit is changed to indicate that it is clean. If the data was indicated as not dirty by the dirty bit, the step of writing to memory (Step K) is skipped.

In the MIPS architecture, certain virtual addresses can be unmapped and refer directly to physical memory locations. Preferably, a 32 bit address is used with a specified pattern in address bits 31-29 indicating unmapped references. Unmapped references do not need either the TLB slice or the full TLB.

Non-cacheable references are also referred to by a special coded value in address bits 31-29 or by a bit in the full TLB entry. Since in the latter case there is no cache tag to reference, the TLB slice will miss. The non-cachable bit in the full TLB will be discovered after a cache miss. The address translation is carried out with a full TLB.

In the preferred embodiment, the 32 bits of the address have identical address bits 13-0 for the virtual address and the physical address. Bits 16-14 of the virtual address are used to index into the appropriate TLB slice. The selected TLB slice entry contains physical address bits 17-14. The VPN consists of bits 31-14. Physical address bits 17-0 are used to read the cache memory. If the full TLB is read, physical address bits 35-14 from the full TLB are compared to the physical tag bits 35-14.

The TLB slice can consist of a small number of words (8 in the preferred embodiment), yet still achieve a high hit rate if the page size is large enough (16K bytes in the preferred embodiment) or it is used after the virtual index cache. The TLB slice width equals the base 2 logarithm of the ratio of the size of one bank of cache to the page size. This ratio is 16 in the preferred embodiment, so the TLB slice is four bits wide.

FIG. 11 shows a preferred embodiment of the TLB slice using latches and multiplexers. FIG. 11 shows 16 rows of four latches each, with latches 1A, 1B, 1C and 1D forming the first row and latches 16A, 16B, 16C and 16D forming the last row. The data to be stored in the latches is provided on data input lines DI1-DI4. The output of each row of latches is provided to a 16-1 multiplexer, with the outputs of multiplexers 170, 172, 174 and 176 being the four bit data output DO1, DO2, DO3 and DO4, respectively. In the first row, latches 1A, 2A, on up through 16A provide their outputs to the inputs of 16-1 multiplexer 170. The output of multiplexer 170 forms the first data output bit. The selection of the particular one of the sixteen inputs to the four latches to be read is accomplished by a four bit select input provided to all the multiplexers on four read address lines 178.

As can be seen FIG. 11 shows a very fast memory since the outputs of all the latches are present at the inputs of the multiplexer, and the memory access time is simply the time required for the read address to select the appropriate multiplexer input for use as an output.

In order to write data into the latches of FIG. 11, one of write-enable lines WE1-WE16 is enabled. For instance, if WE2 is enabled, the latches 2A, 2B, 2C and 2D have their enable inputs enabled so that the data on data lines DI1-DI4 is written into these latches, and not any of the other latches. The write-enable signal is produced by decoding four write address bits provided to decoder 180. Only one of the 16 outputs of the decoder will be enabled, enabling the appropriate row of latches. The output is ANDed with a write-enable signal on a line 182 in a number of AND gates AND1-AND16. This is done so that the write-enable outputs will not be provided until the decoder outputs have stabilized. The write address and read address could, of course, be from the same address bus with the inverse of the write-enable or a read signal being provided as an enable input to the multiplexers.

If the number of entries in the TLB slice is large enough, then it is possible to use "page coloring" so that the TLB slice miss rate drops to zero. In contrast, page coloring cannot reduce the miss rate in a conventional TLB. Page coloring is a way to restrict the assignment of virtual pages to physical memory locations so that N low order bits of the virtual page number match N low order bits of the physical page number. If the width of the TLB slice is N and the number entries in the TLB is $2^N$, then the TLB slice will become an identity and its miss rate will drop to zero.

As will be understood by those familiar with the art, the present invention may be embodied in other specific forms without departing from the spirit or essential characteristics thereof. For example, the TLB slice could be in RAM instead of using latches and multiplexers. Accordingly, the disclosure of the preferred embodiment of the invention is intended to be illustrative, but not limiting, of the scope of the invention which is set forth in the following claims.

What is claimed:

1. An apparatus for addressing memory using input virtual addresses having an input virtual page number and an offset, comprising a first TLB slice memory, having an address input coupled to receive a defined subset of the bits of said virtual page number, for storing at each location a portion of a previously accessed physical address corresponding to one of said input virtual addresses, said first TLB slice memory providing said portion of a physical address without using any virtual tag or providing any hit/miss signal.

2. The apparatus of claim 1 further comprising:
   a cache memory for storing data having physical indexes;

a virtual tag memory for storing a virtual page number tag for said data at a corresponding physical index; and means for comparing a selected virtual page number tag from said virtual tag memory to said given virtual page number.

3. The apparatus of claim 2 further comprising means for providing a first select signal to said multiplexing means for a data fetch and a second select signal for an instruction fetch.

4. The apparatus of claim 1 further comprising:

a first cache memory for storing data having physical indexes;

a virtual tag memory for storing a virtual page number tag for said data a corresponding physical index; and first means for comparing a selected virtual page number tag from said virtual tag memory to said input virtual page number.

5. The apparatus of claim 4 wherein said apparatus uses a two-way set-associative cache memory including said first cache memory and further comprising:

a second cache memory for storing second data having physical indexes;

a second virtual tag memory for storing a virtual page number tag for said second data at a corresponding physical index; and second means for comparing a selected virtual page number tag from said second virtual tag memory to said input virtual page number.

6. The apparatus of claim 5 further comprising a multiplexer having first and second inputs coupled to receive data from said first and second cache memories.

7. The apparatus of claim 6 further comprising logic means coupled to the outputs of said first and second means for comparing for providing a select input to said multiplexer to select data corresponding to a tag which matches said virtual page number and to provide a hit/miss output indicating whether one of said comparators indicates a match.

8. The apparatus of claim 7 further comprising:

a full translation look-aside buffer (TLB);

means for comparing an output of said full TLB to an output of said TLB slice memory; and state machine logic, coupled to said hit/miss output, for controlling the writing of data and addresses into said TLB slice memory when a miss signal is received on said hit/miss output and said TLB slice output and said full TLB output do not match, and writing into said cache memory and virtual tag memory when said miss signal is received and said TLB slice output and said full TLB output do match.

9. The apparatus of claim 1 further comprising:

a virtual cache memory;

means for accessing said virtual cache memory with one of said input virtual addresses; and means for indicating a miss in said virtual cache memory and enabling an access of said TLB slice memory with said one input virtual address.

10. An apparatus for addressing memory using input virtual addresses having an input virtual page number and an offset, comprising:

a cache memory for storing data having physical indexes;

a virtual tag memory for storing a virtual page number tag for said data at a corresponding physical index;

a TLB slice memory, having an address input coupled to receive a defined portion of the bits of the input virtual page numbers, for storing a last accessed one of said physical indexes corresponding to each combination of the bits of a portion of one of the input virtual page numbers, said TLB slice memory having data outputs coupled to said cache memory and virtual tag memory for providing a physical address index to select a virtual page number tag at said physical index from said virtual tag memory and to select data from said cache memory at said physical index plus said offset; and means for comparing said selected virtual page number tag to said input virtual page number to determine whether the correct data was selected.

* * * * *